L. T. ROBINSON.
MAXIMUM DEMAND INDICATOR.
APPLICATION FILED DEC. 31, 1913.
1,159,800.
Patented Nov. 9, 1915.
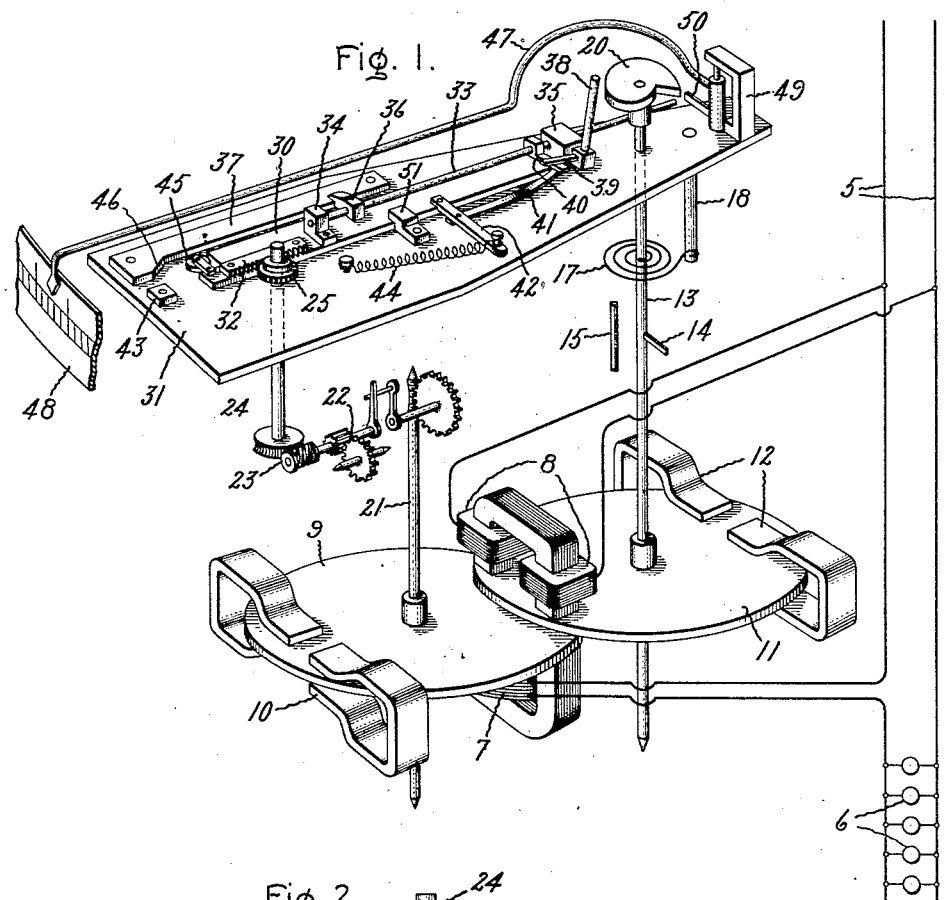
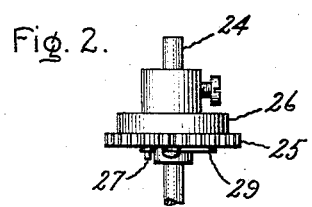
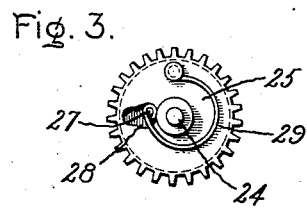
Witnesses:
George H. Tilden
J. Ellis Glen
Inventor:
Lewis T. Robinson.
by Albert G. Davis
His Attorney.

UNITED STATES PATENT OFFICE.

LEWIS T. ROBINSON, OF SCHENECTADY, NEW YORK, ASSIGNOR TO GENERAL ELECTRIC COMPANY, A CORPORATION OF NEW YORK.

MAXIMUM-DEMAND INDICATOR.

1,159,800. Specification of Letters Patent. Patented Nov. 9, 1915.

Application filed December 31, 1913. Serial No. 809,825.

*To all whom it may concern:*

Be it known that I, LEWIS T. ROBINSON, a citizen of the United States, residing at Schenectady, county of Schenectady, State of New York, have invented certain new and useful Improvements in Maximum-Demand Indicators, of which the following is a specification.

My invention relates to maximum demand indicating instruments, and in particular to maximum demand indicators of the type described in my application for Letters Patent filed May 22, 1913, Serial No. 769,168.

The maximum demand indicator described in my above identified application comprises a watt-hour meter element which actuates a movable element. When the movable element has been moved a distance which is substantially a measure of the rate of consumption of energy, it is returned to its initial or zero position, and the cycle of operations is then repeated. In the indicator described in my former application an electromagnet is employed to interrupt the operative engagement of the watt-hour meter element with the movable element to permit the movable element to return to its initial position. The circuit of the electromagnet is completed by a pair of coöperating contacts, one of which is actuated by the watt-hour meter element and the other is actuated by an indicating wattmeter element. While I have experienced no difficulty in the use of movable electric contacts in this type of meter, nevertheless, such contacts are regarded as objectionable and undesirable in commercial types of instruments, and the object of my present invention is to eliminate the contacts and the electric circuit including the electromagnet employed in my former indicator.

The object of my present invention is, accordingly, to provide means consisting entirely of mechanical elements for interrupting the operative engagement between the watt-hour meter element and the movable element.

A further object of my invention is to provide the indicating wattmeter element of a maximum demand indicator of the type described in my former application with a novel device for determining the extent of movement of the movable element from its initial position as a function of the rate of consumption of energy.

The features of my invention which I consider patentably novel are definitely indicated in the claims appended hereto.

The details of construction and mode of operation of a maximum demand indicator embodying the novel features of my invention will be understood from the following description taken in connection with the accompanying drawings, in which—

Figure 1 is a diagrammatic view in perspective of a maximum demand indicator embodying the features of my present invention; and Figs. 2 and 3 are views illustrating certain details of construction.

Referring to Fig. 1 of the drawings, there is shown a system of distribution comprising conductors 5 supplying electric energy to translating devices 6. A watt-hour meter of the induction type is operatively connected to the system in the usual manner for the purpose of integrating and recording the total quantity of energy consumed in the translating devices. The induction wattmeter comprises the usual series coil 7 and potential coils 8 which produce a rotary magnetic field proportional to the rate of consumption of energy in the well understood manner.

Two rotatable disk armatures are located within the influence of the magnetic field produced by the coils 7 and 8. One of these disk armatures 9 is arranged as the rotatable element of a watt-hour meter. Permanent magnets 10 are mounted in operative relation to the disk armature 9, so that the revolutions of the armature are directly proportional to the watt-hours of energy consumed in the translating devices. The second armature 11 is arranged as the movable element of an indicating wattmeter. Permanent magnets 12 are operatively associated with the indicating wattmeter armature 11.

A shaft 13 is rigidly secured to the indicating wattmeter armature 11. A control spring 17 is operatively connected at one end to the shaft 13 and at the other end to a fixed part 18 of the instrument. The control spring is designed to render the movement of the disk armature 11 a measure of the strength of the magnetic field, and thus a measure of the rate of consumption of energy. The disk armature 11 moves in a clockwise direction, as viewed from above, upon an increase in the rate of consumption of energy in the translating devices 6.

The zero or initial position of the indicating wattmeter element is determined when the spring 17 is completely unwound and under no tension and the moving element is thus occupying a position of natural equilibrium. A stop 15 is provided in the path of an arm 14 secured to the shaft 13 and limits the movement of the indicating wattmeter armature in both directions. The pin is so proportioned and positioned that when the indicating wattmeter armature is in its initial or zero position the arm 38, hereinafter more particularly referred to, is a minimum distance from the periphery of the cam 20, and when the armature has moved to its limiting position in a clockwise direction the arm 38 is a maximum distance from the periphery of the cam. The stop thus prevents inaccurate registrations in cases where the rate of consumption of energy is so excessive as to turn the indicating wattmeter armature through an angle greater than 360°, and also prevents damage to the arm 38 which would be likely to occur if the movement of the cam 20 were not restrained within certain limits.

A shaft 21 is rigidly secured to the rotatable disk 9 of the watt-hour meter element. The shaft 21 drives, through gearing 22, the usual registering mechanism of the meter. The registering mechanism has been omitted in the drawings as it forms no part of my invention. The rotatable shaft 21 also drives, through the worm gearing 23, a vertically arranged shaft 24. A pinion 25 is mounted on the shaft 24 and is adapted to be driven thereby by means of a resilient connection shown in detail in Figs. 2 and 3. The pinion 25 is primarily loosely mounted on the shaft 24. A hub 26 is rigidly secured to the shaft 24 and is provided with a pin 27 which extends through a slot 28 in the pinion 25. A leaf spring member 29 is secured at one end to a pin carried by the pinion 25 and at the other end to the pin 27, and normally tends to hold the pin 27 in one end of the slot 28. It will thus be seen that a certain relative movement of the pinion 25 with respect to the shaft 24 is permitted by this resilient connection.

A longitudinally movable member 30 is supported upon a horizontal base plate 31 and is provided with a rack 32 adapted to mesh with the pinion 25. A rod 33 is pivoted in blocks 34 and 35 mounted on the movable member 30. A catch 36 is rigidly secured to the rod 33, and is provided with a notched portion adapted to engage with a guide member 37. When the notched portion of the catch 36 operatively engages with the edge of the guide member 37 the rack 32 is held in operative engagement with the pinion 25. A fixed block 51 coöperates with the pinion 25 and the catch 36 to aline the path of movement of the member 30.

A movable arm 38 is pivoted to the block 35. A finger 39 is secured to the arm 38 and rests upon a finger 40 secured to the rod 33. A leaf spring 41 is secured to the movable member 30 by means of an arm 42 and extends under the fingers 40 and 39. The action of the spring 41 is thus to force the finger 40 upwardly thereby insuring the engagement of the catch 36 with the guide member 37.

A cam 20 is rigidly secured to the shaft 13 of the indicating wattmeter element. This cam is so shaped that the distance from the initial position of the movable member 30, and, accordingly, the distance from the initial position of the arm 38, in the path of movement of these members, to the periphery of the cam is substantially a measure of the rate of consumption of energy in the translating devices 6.

The remaining details of construction of my improved maximum demand indicator will be best understood from a description of the operation thereof.

The initial position of the movable member 30 is determined when this member rests against a fixed stop 43. As energy is consumed in the translating devices 6 the indicating wattmeter armature 11 will take up a position which is always a measure of the rate of consumption of energy in these devices. At the same time the watt-hour meter armature 9 will begin to rotate and will actuate the movable member by means of the pinion 25 and coöperating rack 32 from its initial position toward the right of the figure. The path of movement of the arm 38 is such that it always intersects the periphery of the cam 20. When the movable member 30, and, accordingly, the movable arm 38, have moved a distance from their respective initial positions which is substantially a measure of the rate of consumption of energy in the translating devices 6, the periphery of the cam 20 will intercept the movement of the arm 38. As the movable member 30 continues to advance the arm 38 is slightly turned, thus forcing its finger 39 downwardly against the action of the spring 41. This downward motion of the finger 39 turns the rod 33 and raises the catch 36 from operative engagement with the guide 37. A spring 44, secured at one end to the arm 42 and at the other end to a fixed part of the supporting plate 31, now pulls the rack 32 out of engagement with the pinion 25 and also pulls the movable member 30 back to its initial position. Just before the movable member 30 reaches its initial position a wheel 45, secured at one corner of the member 30, engages with a cam surface 46 on the guide member 37 and thus forces the rack 32 downward and into mesh with the pinion 25. Due to the resilient connection of the pinion 25 to the shaft 24, as described in detail in connection with Figs. 2 and 3, the rack 32 easily meshes with its driving pinion 25. As soon as the wheel 45 forces the rack 32 into mesh with the pinion 25, due to its engagement with the cam surface 46, the movable member 30 becomes sufficiently far removed from the guide member 37 for the notched portion of the catch 36 to drop into operative engagement with the guide member. The cycle of operations is then repeated.

If the consumption of energy in the translating devices 6 is interrupted before the arm 38 is intercepted by the periphery of the cam 20, the cam will rotate in a counter-clockwise direction due to the return of the wattmeter disk 11 to its initial position, and in this counter-clockwise rotation the periphery of the cam will strike the arm 38, and the movable member 30 will be returned to its initial position. The movable member 30 is thus returned to its initial position each time that the consumption of energy in the installation is interrupted and a new measurement of demand is accordingly begun each time that the consumption of energy is resumed.

The maximum movement of the movable member 30 is indicated by a non-return pointer 47 which sweeps across a coöperating scale 48. The pointer is pivotally mounted in a block 49 secured to the supporting plate 31, and its pivoted sleeve is provided with a lug 50 which lies in the path of movement of the upper end of the rod 33. The rod 33 thus engages with the lug 50 and moves the pointer 47, thereby indicating the maximum movement of the movable member from its initial position.

Numerous modifications in the details of construction of my improved maximum demand indicator will be evident to those skilled in the art. While I have described my invention, for the purposes of illustration, embodied in an instrument of the induction meter type having all of its operative elements actuated by the same field coils, it will be obvious that my invention is not limited either to an instrument of this particular type or to an instrument in which the watt-hour meter element and the wattmeter element are actuated by the same field coils. I do not, therefore, desire to be limited to the specific construction which I have herein described and illustrated, and I aim by the terms of the appended claims to cover all modifications which are within the spirit and scope of my invention.

What I claim as new and desire to secure by Letters Patent of the United States, is,—

1. A maximum demand indicator comprising in combination an electric motor meter element, an indicating electric meter element adapted to always occupy a position which is substantially a measure of the rate of consumption of energy, a movable member adapted to be actuated by said motor meter element, means consisting entirely of mechanical elements operatively related to said movable member and coöperating with said indicating meter element for interrupting the movement of said movable member when the distance the member has moved from its initial position is substantially a measure of the rate of consumption of energy, and means for indicating the maximum movement of said movable member.

2. A maximum demand indicator comprising in combination a watt-hour meter element and an indicating wattmeter element, a movable member having an initial position, means for operatively connecting said watt-hour meter element to said movable member, means tending to return said movable member to its initial position, means consisting entirely of mechanical elements and including said last mentioned means operatively related to said movable member and coöperating with said indicating wattmeter element for interrupting the operative connection between said watt-hour meter element and said movable member when the distance the member has moved from its initial position is substantially a measure of the rate of consumption of energy, and means for indicating the maximum movement of said movable member.

3. A maximum demand indicator comprising in combination a watt-hour meter element, an indicating wattmeter element adapted to always occupy a position which is substantially a measure of the rate of consumption of energy, a movable member adapted to be actuated by said watt-hour meter element, means consisting entirely of mechanical elements operatively related to said movable member and coöperating with said indicating wattmeter element for interrupting the movement of said movable member when the distance the member has moved from its initial position is substantially a measure of the rate of consumption of energy, and means for indicating the maximum movement of said movable member.

4. A maximum demand indicator comprising in combination a watt-hour meter element, an indicating wattmeter element having an initial position and adapted to always occupy a position whose distance from said initial position is substantially a measure of the rate of consumption of energy, a movable member having an initial position and adapted to be actuated by said watt-hour meter element, means consisting entirely of mechanical elements operatively related to said movable member and coöperating with said indicating wattmeter element for returning said movable member to its initial position when the distance said member has moved from its initial position is a predetermined function of the distance of said indicating wattmeter element from its initial position, and means for indicating the maximum movement of said movable member.

5. A maximum demand indicator comprising in combination a watt-hour meter element and an indicating wattmeter element, a movable member having an initial position, means for operatively connecting said watt-hour meter element to said movable member, a second movable member operatively connected to said indicating wattmeter element, and means consisting entirely of mechanical elements and operatively related to said first mentioned movable member adapted to engage with said second movable members whereby said first mentioned movable member is returned to its initial position, and means for indicating the maximum movement of said first mentioned movable member.

6. A maximum demand indicator comprising in combination a watt-hour meter element and an indicating wattmeter element, a movable member having an initial position, means for operatively connecting said watt-hour meter element to said movable member, an involute-shaped cam operatively connected to said indicating wattmeter element, an arm carried by said movable member and having a path of movement which always intersects the periphery of said cam, means operatively related to said arm whereby said movable member is returned to its initial position when the periphery of the cam intercepts the movement of said arm, and means for indicating the maximum movement of said movable member.

7. A maximum demand indicator comprising in combination a watt-hour meter element and an indicating wattmeter element, an involute-shaped cam operatively connected to said indicating wattmeter element, a movable element having an initial position and adapted to be actuated by said watt-hour meter element and having a path of movement which always intersects the periphery of said cam, means operatively related to said movable element whereby said element is returned to its initial position when the periphery of said cam intercepts the movement of the movable element, and means for indicating the maximum movement of said movable element.

8. A maximum demand indicator comprising in combination a watt-hour meter element and an indicating wattmeter element, a movable element having an initial position and adapted to be actuated by said watt-hour meter element, a cam operatively connected to said indicating wattmeter element and so shaped that the distance from the initial position of said movable element to the periphery of said cam is substantially a measure of the rate of consumption of energy, said movable element being so arranged that its path of movement always intersects the periphery of said cam, means operatively related to said movable element whereby said element is returned to its initial position when the periphery of said cam intercepts the movement of the movable element, and means for indicating the maximum movement of said movable element.

9. A maximum demand indicator comprising in combination a watt-hour meter element and an indicating wattmeter element, a movable member having an initial position, means whereby said movable member is operatively connected to said watt-hour meter element, a cam operatively connected to said indicating wattmeter element and so shaped that the distance from the initial position of said movable member to the periphery of said cam is substantially a measure of the rate of consumption of energy, an arm carried by said movable member and having a path of movement which always intersects the periphery of said cam, means for normally maintaining said movable member operatively connected to said watt-hour meter element, means actuated by said arm when the periphery of the cam intercepts the movement of the arm for placing said last mentioned means in inoperative position, means for returning the movable member to its initial position when the operative connection between said movable member and the watt-hour meter element is interrupted, and means for indicating the maximum movement of said movable member.

In witness whereof, I have hereunto set my hand this 29th day of December, 1913.

LEWIS T. ROBINSON.

Witnesses:
BENJAMIN B. HULL,
HELEN ORFORD.